United States Patent
Spangler et al.

(10) Patent No.: US 11,480,059 B2
(45) Date of Patent: Oct. 25, 2022

(54) AIRFOIL WITH RIB HAVING CONNECTOR ARMS

(71) Applicant: United Technologies Corporation, Farmington, CT (US)

(72) Inventors: Brandon W. Spangler, Vernon, CT (US); David R. Pack, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 404 days.

(21) Appl. No.: 16/545,417

(22) Filed: Aug. 20, 2019

(65) Prior Publication Data
US 2021/0054747 A1 Feb. 25, 2021

(51) Int. Cl.
*F01D 5/18* (2006.01)
*F01D 5/14* (2006.01)

(52) U.S. Cl.
CPC .............. *F01D 5/188* (2013.01); *F01D 5/141* (2013.01); *F05D 2220/323* (2013.01); *F05D 2240/301* (2013.01); *F05D 2240/35* (2013.01); *F05D 2250/185* (2013.01)

(58) Field of Classification Search
CPC .......... F01D 5/141; F01D 5/147; F01D 5/181; F01D 5/186–189; F05D 2220/323; F05D 2240/301; F05D 2240/35; F05D 2250/185
See application file for complete search history.

(56) References Cited

U.S. PATENT DOCUMENTS

| | | | | |
|---|---|---|---|---|
| 3,891,348 | A | * | 6/1975 | Auxier .................... F01D 5/189 416/97 R |
| 5,624,231 | A | * | 4/1997 | Ohtomo .................. F01D 5/186 415/115 |
| 7,556,476 | B1 | | 7/2009 | Liang |
| 9,551,228 | B2 | | 1/2017 | Propheter-Hinckley et al. |
| 9,850,763 | B2 | * | 12/2017 | Itzel ........................ F01D 9/041 |
| 10,024,171 | B2 | | 7/2018 | Itzel |
| 10,494,931 | B2 | | 10/2019 | Landrum et al. |
| 10,533,427 | B2 | * | 1/2020 | Marsh ..................... F01D 5/189 |
| 10,662,778 | B2 | * | 5/2020 | Marsh ........................ F01D 5/18 |
| 10,711,619 | B2 | * | 7/2020 | Marsh ..................... F01D 5/186 |
| 10,830,061 | B2 | * | 11/2020 | Marsh ..................... F01D 5/186 |

(Continued)

FOREIGN PATENT DOCUMENTS

| | | |
|---|---|---|
| WO | 2015171145 | 11/2015 |
| WO | 2017039571 | 3/2017 |
| WO | 2017039572 | 3/2017 |

OTHER PUBLICATIONS

European Search Report for European Patent Application No. 20191609.5 completed Oct. 28, 2020.

*Primary Examiner* — Woody A Lee, Jr.
*Assistant Examiner* — Justin A Pruitt
(74) *Attorney, Agent, or Firm* — Carlson, Gaskey & Olds, P.C.

(57) ABSTRACT

An airfoil includes an airfoil wall that defines a leading end, a trailing end, and first and second sides that join the leading end and the trailing end. A rib connects the first and second sides of the airfoil wall. The rib defines a tube portion that circumscribes a rib passage, and first and second connector arms that solely join the tube portion to, respectively, the first and second sides of the airfoil wall.

8 Claims, 8 Drawing Sheets

(56) References Cited

U.S. PATENT DOCUMENTS

| | | |
|---|---|---|
| 2012/0269647 A1 | 10/2012 | Vitt et al. |
| 2016/0222796 A1* | 8/2016 | Spangler ................. F01D 5/187 |
| 2019/0024515 A1 | 1/2019 | Marsh et al. |
| 2019/0093487 A1 | 3/2019 | Marsh et al. |

* cited by examiner

AIRFOIL WITH RIB HAVING CONNECTOR ARMS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, and first and second sides that join the leading end and the trailing end. A rib connects the first and second sides of the airfoil wall and defines a tube portion that circumscribes a rib passage. First and second connector arms solely join the tube portion to, respectively, the first and second sides of the airfoil wall.

In a further embodiment of any of the foregoing embodiments, the airfoil wall and the rib bound a cooling channel there between, and the cooling channel is flow isolated from the rib passage.

In a further embodiment of any of the foregoing embodiments, the airfoil wall and the rib bound a cooling channel there between, and the rib includes at least one cooling aperture connecting the cooling channel and the rib passage.

In a further embodiment of any of the foregoing embodiments, the tube portion includes forward and aft walls and first and second side walls joining the forward and aft walls. The first connector arm projects from the first side wall and the second connector arm projects from the second side wall.

In a further embodiment of any of the foregoing embodiments, the airfoil wall and the rib bound a cooling channel there between, and at least one of the first and second side walls includes at least one cooling aperture connecting the rib passage and the cooling channel.

In a further embodiment of any of the foregoing embodiments, the airfoil wall and the rib bound a cooling channel there between, at least one of the first and second side walls includes at least one cooling aperture connecting the rib passage and the cooling channel, and the at least one cooling aperture is aft of the first and second connector arms.

In a further embodiment of any of the foregoing embodiments, the airfoil wall and the rib bound a cooling channel there between, and forward wall includes at least one cooling aperture connecting the rib passage and the cooling channel.

An airfoil according to an example of the present disclosure includes an airfoil wall that defines a leading end, a trailing end, and first and second sides that join the leading end and the trailing end. The first and second sides span in a radial direction, and first, second, and third ribs connect the first and second sides of the airfoil wall. Each of the first, second, and third ribs define a tube portion that circumscribes a rib passage. First and second connector arms solely join the tube portion to, respectively, the first and second sides of the airfoil wall. The first rib and the airfoil wall bound a first cooling channel there between. The first rib, the second rib, and the airfoil wall bound a second cooling channel there between. The second rib, the third rib, and the airfoil wall bound a third cooling channel there between.

In a further embodiment of any of the foregoing embodiments, the rib passages are flow isolated from each of the first cooling channel, the second cooling channel, and the third cooling channel.

In a further embodiment of any of the foregoing embodiments, the second cooling channel and the third cooling channel are connected in a serpentine flow pattern.

In a further embodiment of any of the foregoing embodiments, the first cooling channel is flow isolated from the second cooling channel and the third cooling channel.

In a further embodiment of any of the foregoing embodiments, the first cooling channel, the second cooling channel, and the third cooling channel are flow isolated from each other.

A further embodiment according to an example of the present disclosure includes a fourth rib that also connects the first and second sides of the airfoil wall and also defines a respective tube portion that circumscribes a respective rib passage, with respective first and second connector arms that solely join the tube portion to, respectively, the first and second sides of the airfoil wall.

In a further embodiment of any of the foregoing embodiments, the third rib, the fourth rib, and the airfoil wall bound a fourth cooling channel there between.

In a further embodiment of any of the foregoing embodiments, the fourth rib includes at least one cooling aperture aft of the respective connector arms of the fourth rib.

In a further embodiment of any of the foregoing embodiments, the tube portion of each of the first, second, and third ribs includes at least one cooling aperture.

In a further embodiment of any of the foregoing embodiments, except for connection through the first and second wall of the airfoil wall, the first rib, the second rib, and the third rib are disjoined from each other.

In a further embodiment of any of the foregoing embodiments, the airfoil wall includes cooling apertures connecting each of the first cooling channel, the second cooling channel, and the third cooling channel to an exterior gaspath.

In a further embodiment of any of the foregoing embodiments, at least one of the first cooling channel, the second cooling channel, and the third cooling channel is connected to an exterior gaspath through cooling apertures in the first side of the airfoil wall but not the second side of the airfoil wall.

A gas turbine engine according to an example of the present disclosure includes a compressor section, a combustor in fluid communication with the compressor section, and a turbine section in fluid communication with the combustor. The turbine section has an airfoil according to any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
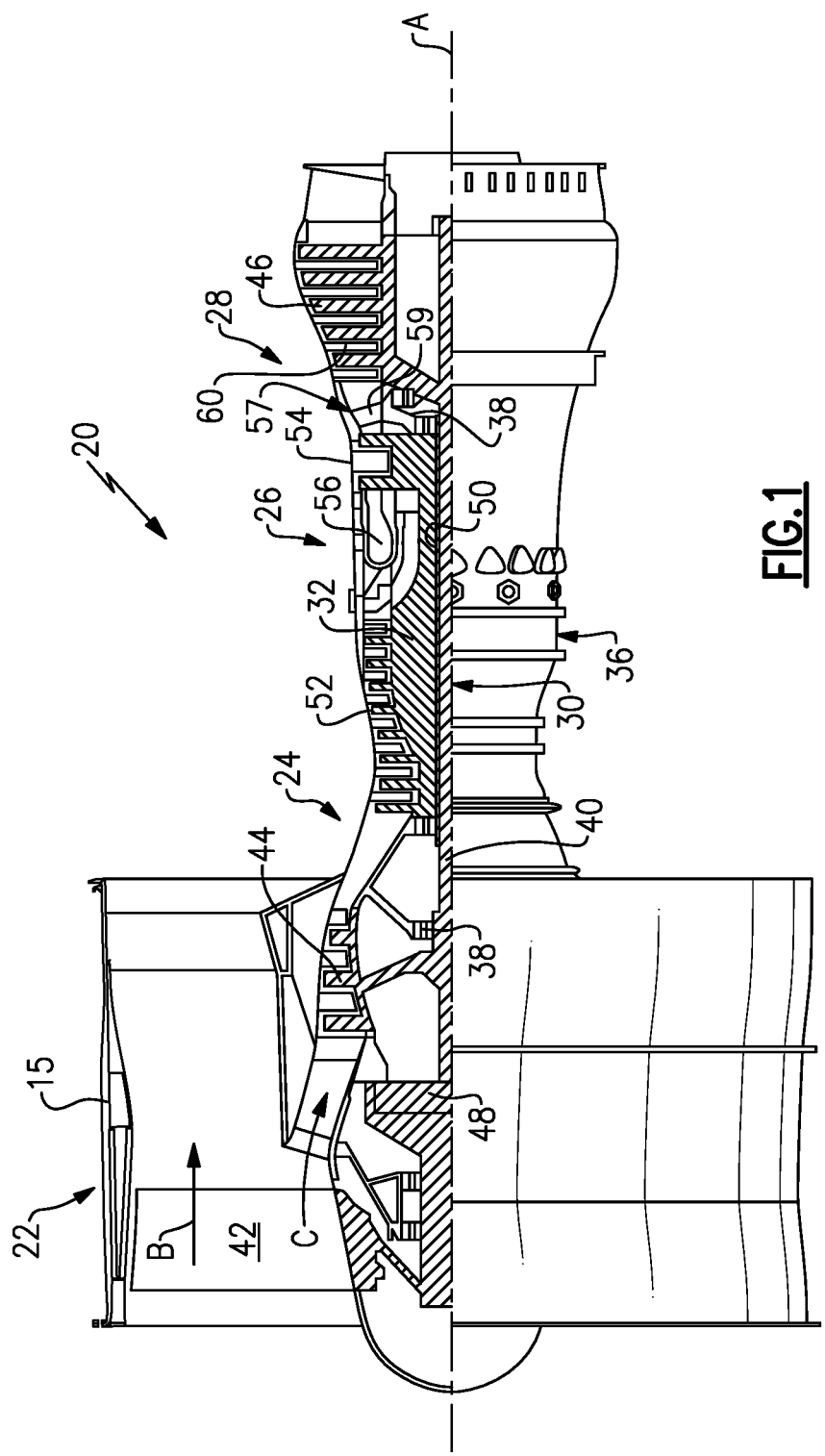
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
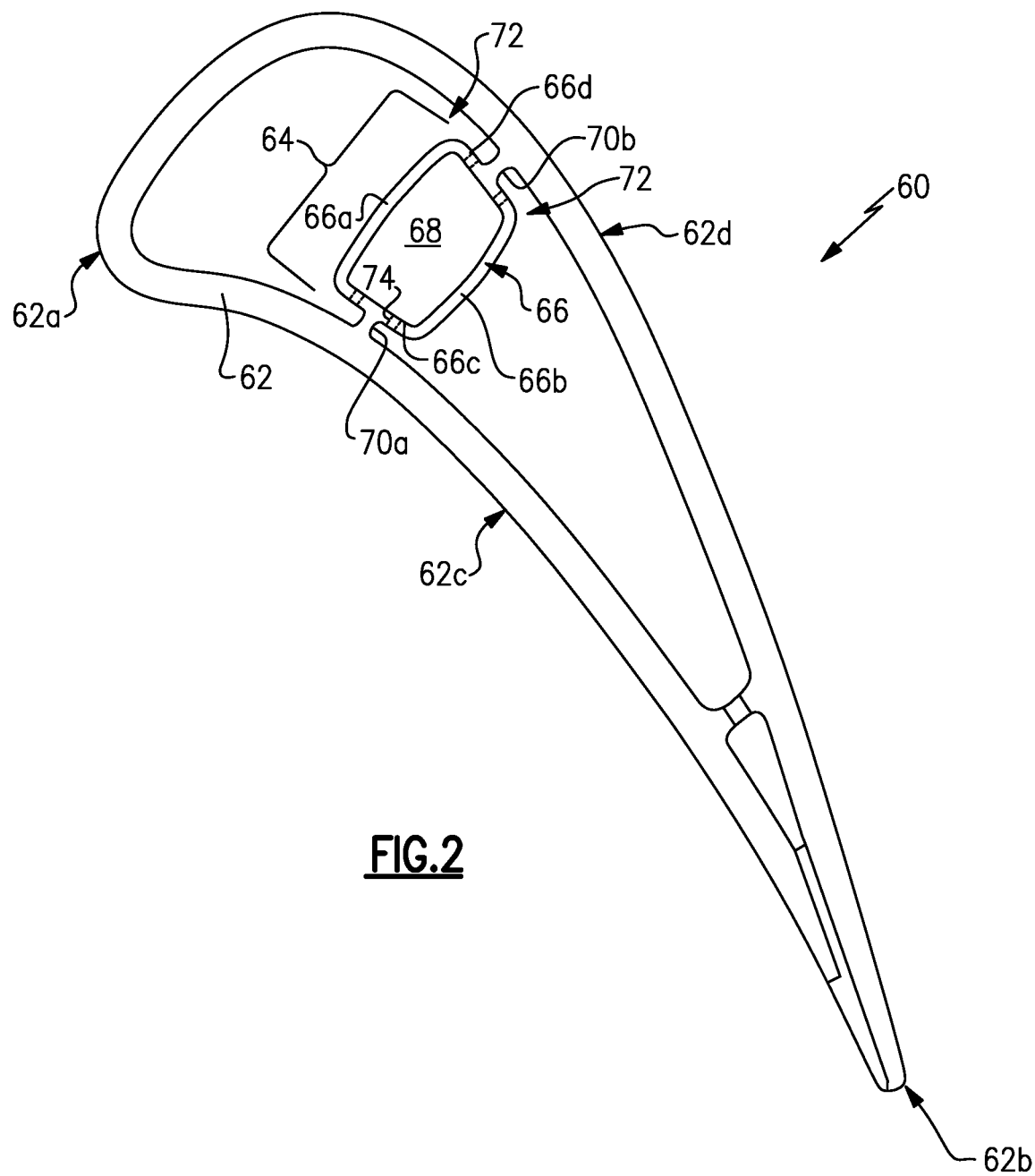
FIG. 2 illustrates a sectioned view of an example airfoil of the engine.
Figure 3:
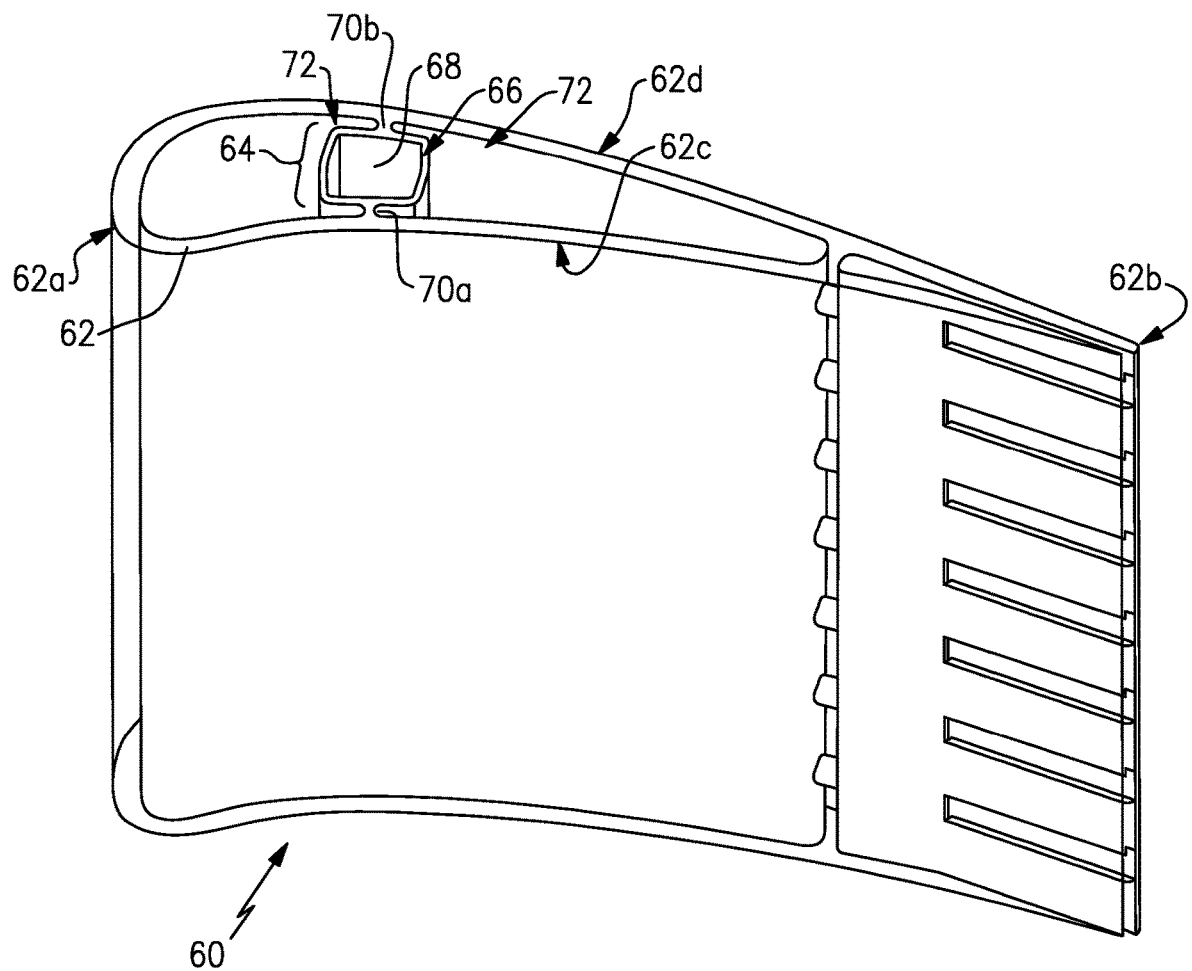
FIG. 3 illustrates a perspective view of the airfoil of FIG. 2.

FIG. 2 illustrates a representative sectioned view of an example of an airfoil 60 used in the turbine engine 20 (see also FIG. 1), and FIG. 3 illustrates a perspective view of the airfoil 60. As shown, the airfoil 60 is a turbine blade; however, it is to be understood that, although the examples herein may be described and shown with reference to turbine blades or vanes, this disclosure is also applicable to cooled blades or vanes in other locations than shown.

The airfoil 60 includes an (outer) airfoil wall 62 that delimits the aerodynamic profile of the airfoil 60. In this regard, the wall 62 defines a leading end 62a, a trailing end 62b, and first and second sides 62c/62d that join the leading end 62a and the trailing end 62b. In this example, the first side 62c is a pressure side and the second side 62d is a suction side. The airfoil wall 62 generally extends in an axial direction relative to the central engine axis A. For a blade, the airfoil wall 62 will typically span in a longitudinal direction from an inner platform to a free tip end. In a vane, the airfoil wall 62 will typically span in a longitudinal direction from an inner platform to an outer platform.

The airfoil 60 further includes at least one rib 64 that connects the first and second sides 62c/62d of the airfoil wall 62. The rib 64 is generally longitudinally elongated between an inner diameter and outer diameter such that it spans the full or substantially full longitudinal distance of the airfoil wall 62. The term substantially full refers to at least 70% of the longitudinal distance between the inner diameter and outer diameter. The rib 64 defines a tube portion 66 that circumscribes a rib passage 68, and first and second connector arms 70a/70b that solely join the tube portion 66 to, respectively, the first and second sides 62c/62d of the airfoil wall 62. As used herein, the phrase "solely join" or variations thereof refers to the arm 70a being the exclusive structural attachment of the tube portion 66 to the first side 62c and the arm 70b being the exclusive structural attachment of the tube portion 66 to the second side 62d. Such an attachment configuration permits the rib 64 to reinforce the sides 62c/62d to facilitate reduction in bulging from internal pressure, while still permitting the rib 64 to move and thermally expand and contract at a different rate than the sides 62c/62d during thermal cycling.

In the illustrated example, the tube portion 66 is generally rectangular and includes forward and aft walls 66a/66b and first and second side walls 66c/66d that join the forward and aft walls 66a/66b. However, other shapes, such as ellipses or triangles may also be used. The first connector arm 70a projects from the first side wall 66c and the second connector arm 70b projects from the second side wall 66d.

The rib 64 partitions the interior cavity of the airfoil 60 such that the airfoil wall 62 and the rib 64 bound cooling channels 72 there between. Cooling air, such as bleed air from the compressor section 24 of the engine 20 can be provided to the cooling channels 72 and the rib passage 68. The cooling air can be fed from a radially inner or radially outer location into the cooling channels 72 and rib passage 68. For example, the tube portion 66 is continuous such that the cooling channels 72 are flow isolated from the rib passage 68. As used herein, the phrase "flow isolated" or variations thereof refers to passages, channels, or both that are not fluidly connected to each other within the airfoil 60 such that air cannot flow within the airfoil 60 from one passage or channel to the other passage or channel. For instance, such flow isolation permits air in the channels and passages to be used for different purposes or at differential pressures. In this regard, cooling air in the cooling channels 72 can be discharged through cooling holes or the like in the side walls 62c/62d to serve for cooling the side walls 62c/62d, while cooling air in the rib passage 68 can serve to cool a blade tip or platform or be provided to other downstream structures.

Alternatively, the tube portion 66 of the rib 64 can include one or more cooling apertures 74 that connect the rib passage 68 with one or both of the cooling channels 72. For instance, the cooling apertures 74 open toward the side walls 62c/62d to provide impingement cooling onto the interior surfaces of the side walls 62c/62d. In this regard, cooling air flows out from the rib passage 68 through cooling apertures 74 and into cooling channels 72. One or both of the forward and aft walls 66a/66b of the tube portion 66 can exclude any cooling apertures, as these walls are not adjacent the airfoil wall 62. In one further example, the tube portion 66 only includes cooling apertures 74 aft of the connector arms 70a/70b such that the forward one of the cooling channels 72 has flow that is isolated from the rib passage 68 and the aft one of the cooling channels 72. Alternatively, cooling apertures 74 may only be included on the forward side of connector arms 70a/70b such that the aft cooling channel 72 is isolated from rib passage 68. In another embodiment, cooling apertures 74 may only be included on one of the rib sidewalls; rib second sidewall 66d, for example.

Figure 4:
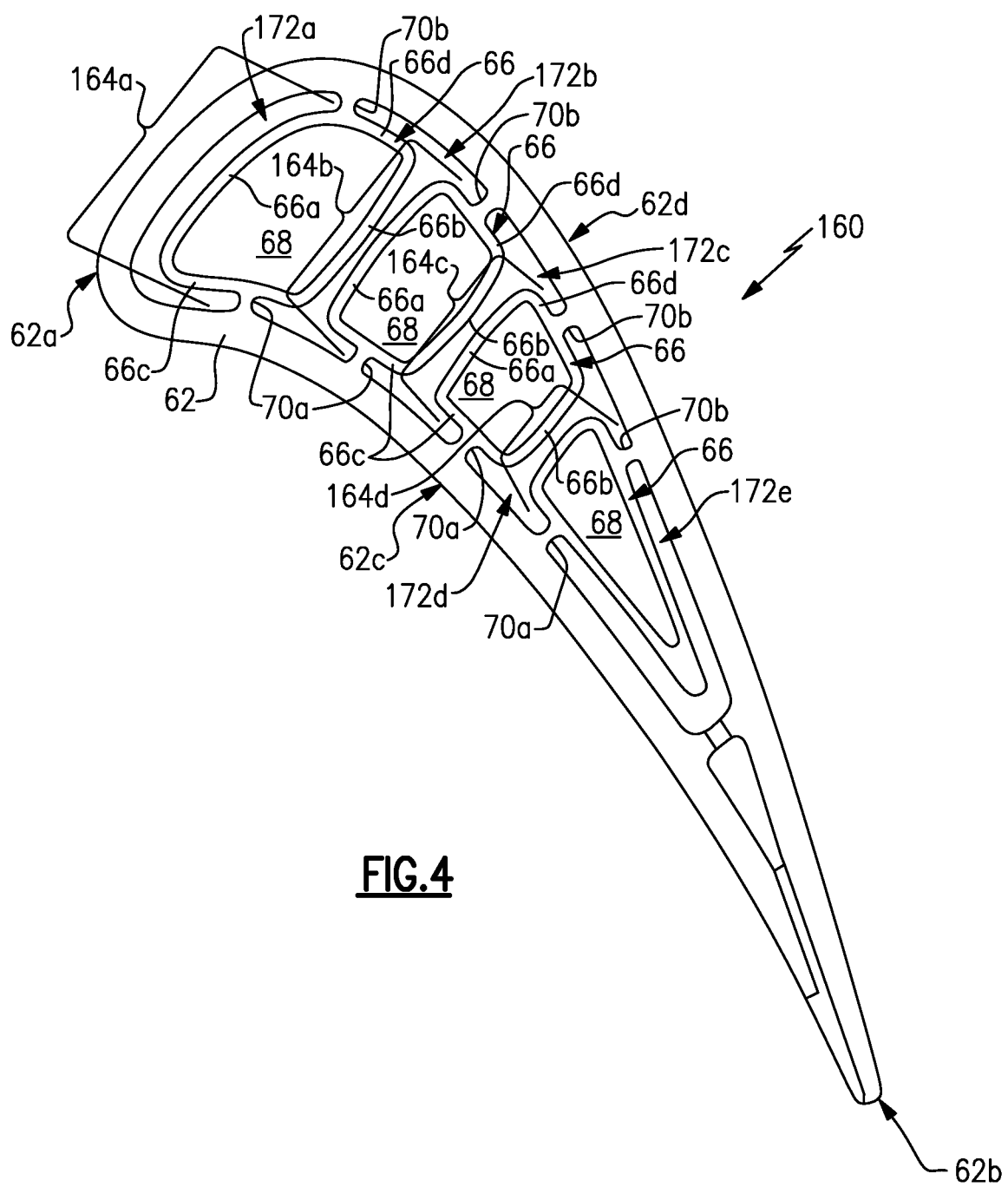
FIG. 4 illustrates another example airfoil for use in the engine and that has multiple ribs.

FIG. 4 illustrates another example airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 includes multiple ribs similar to the rib 64 described above, including first, second, third, and fourth ribs 164a/164b/164c/164d. Like rib 64, each of the ribs 164a/164b/164c/164d connects the first and second sides 62c/62d of the airfoil wall 62. Except for connection through the first and second wall 62c/62d of the airfoil wall 62, the ribs 164a/164b/164c/164d are disjoined from each other. As used herein, the term "disjoined" refers to the ribs 164a/164b/164c/164d excluding any structural attachments to each other. Such an attachment configuration permits the ribs 164a/164b/164c/164d to reinforce the sides 62c/62d to facilitate reduction in bulging from internal pressure, while still permitting the ribs 164a/164b/164c/164d to move and thermally expand and contract at a different rate than the sides 62c/62d during thermal cycling. It is to be appreciated that, although four ribs are shown in the illustrated example, the airfoils herein may include fewer or more than four ribs, such as a single rib, two ribs, three ribs, or five or more ribs.

Each of the ribs 164a/164b/164c/164d includes a respective tube portion 66 that circumscribes a respective rib passage 68, and first and second connector arms 70a/70b that solely join the tube portion 66 to the first and second sides 62c/62d of the airfoil wall 62. In this example, the tube portions 66 of the first, second, and third ribs 164a/164b/164c are generally rectangular, similar to the tube portion 66 of the rib 64 described above. However, the fourth, aft-most rib 164d tapers and is generally triangular, to follow the taper of the airfoil 160 toward the trailing end 62b.

The first rib 164a and the airfoil wall 62 bound a first cooling channel 172a there between. The first rib 164a, the second rib 164b, and the airfoil wall 62 bound a second cooling channel 172b there between. The second rib 164b, the third rib 164c, and the airfoil wall 62 bound a third cooling channel 172c there between. The third rib 164c, the fourth rib 164d, and the airfoil wall 62 bound a fourth cooling channel 172d there between. The fourth rib 164d and the airfoil wall 62 also bound a fifth cooling channel 172e. For example, the cooling channels 172a/172b/172c/172d/172e are flow isolated from each other.

Figure 5A:
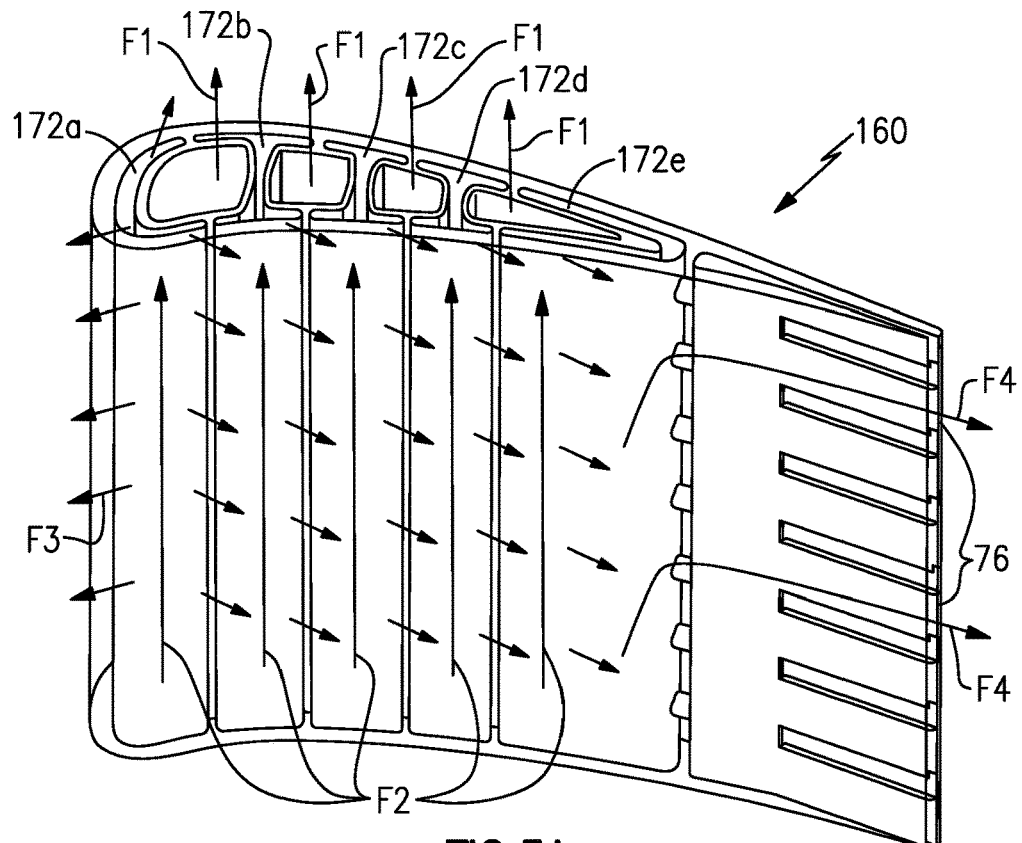
FIGS. 5A and 5B illustrate a radial cooling air flow pattern of the airfoil of FIG. 4.
Figure 5B:
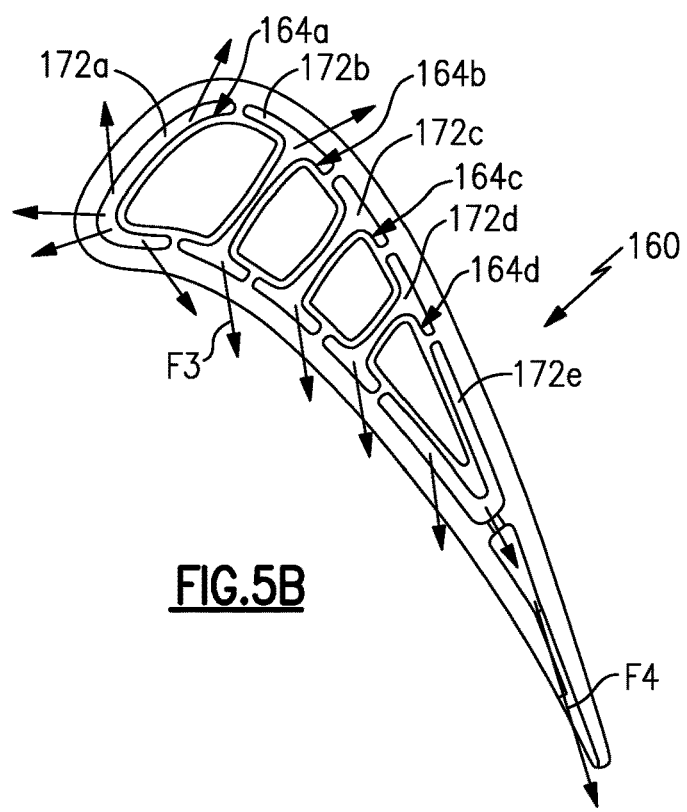

The tube portions 66 can be adapted to provide a desired cooling air flow pattern. In one example, the tube portions 66 are continuous such that all of the cooling channels 172a/172b/172c/172d are flow isolated from each other and from all of the rib passages 68. FIGS. 5A and 5B illustrate an example configured for a radial cooling air flow pattern. It is to be appreciated that the numbering of many of the structures from FIG. 4 has been excluded in order to more clearly show the flow pattern. In this example, cooling air is provided into the rib passages 68 and flows longitudinally (radially), as indicated by flow arrows F1. Cooling air is also provided to the cooling channels 172a/172b/172c/172d and flows longitudinally (radially), as indicated by flow arrows F2. The cooling air in the cooling channels 172a/172b/172c/172d can be discharged through cooling holes or the like in the airfoil wall 62, as indicated by flow arrows F3. The cooling flow in the cooling channel 172e can also flow axially and be discharged through holes or slots 76 in the trailing end 62b, as indicated by flow arrows F4. In the illustrated example the cooling air is fed from the bottom of the airfoil 160, which is the radially inner end of the airfoil 160 and is consistent with flow provided to a blade. Alternatively, for a vane, the cooling air could be fed from the top of the airfoil, which is the radially outer end.

Figure 6A:
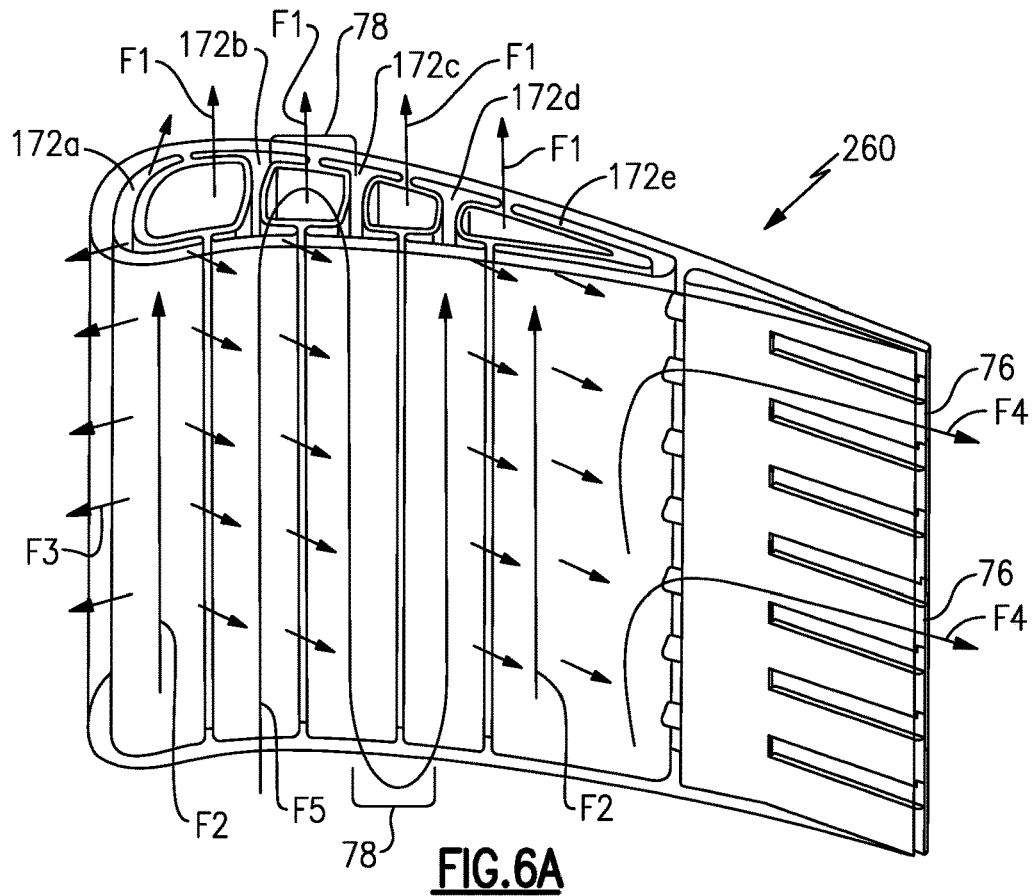
FIGS. 6A and 6B illustrate a modified airfoil that is configured for a serpentine cooling air flow pattern.
Figure 6B:
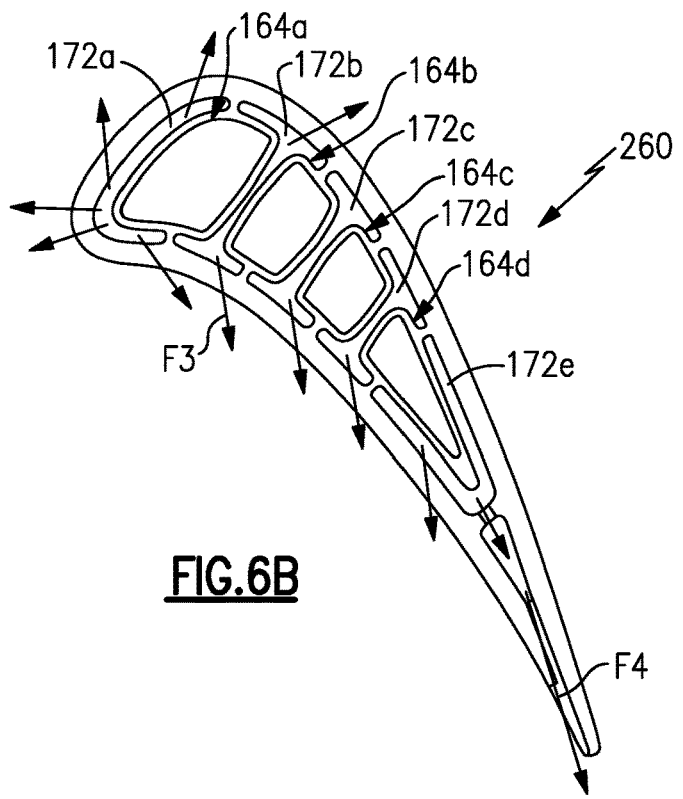

FIGS. 6A and 6B illustrate a modified example of an airfoil 260. The airfoil 260 is similar to the airfoil 160 but is configured for a serpentine cooling air flow pattern. In this example, rather than purely radial flow in the second, third, and fourth cooling channels 172b/172c/172d, the second, third, and fourth cooling channels 172b/172c/172d are connected in a serpentine flow pattern, indicated at flow arrow F5. In this regard, the airfoil 260 may include connector or turn passages 78 at the radial ends of the airfoil 260 (or in the platforms for a vane) to transfer flow between the cooling channels 172b/172c/172d. The cooling air in the cooling channels 172b/172c/172d can be discharged through cooling holes or the like in the airfoil wall 62, as indicated by flow arrows F3.

Figure 7A:
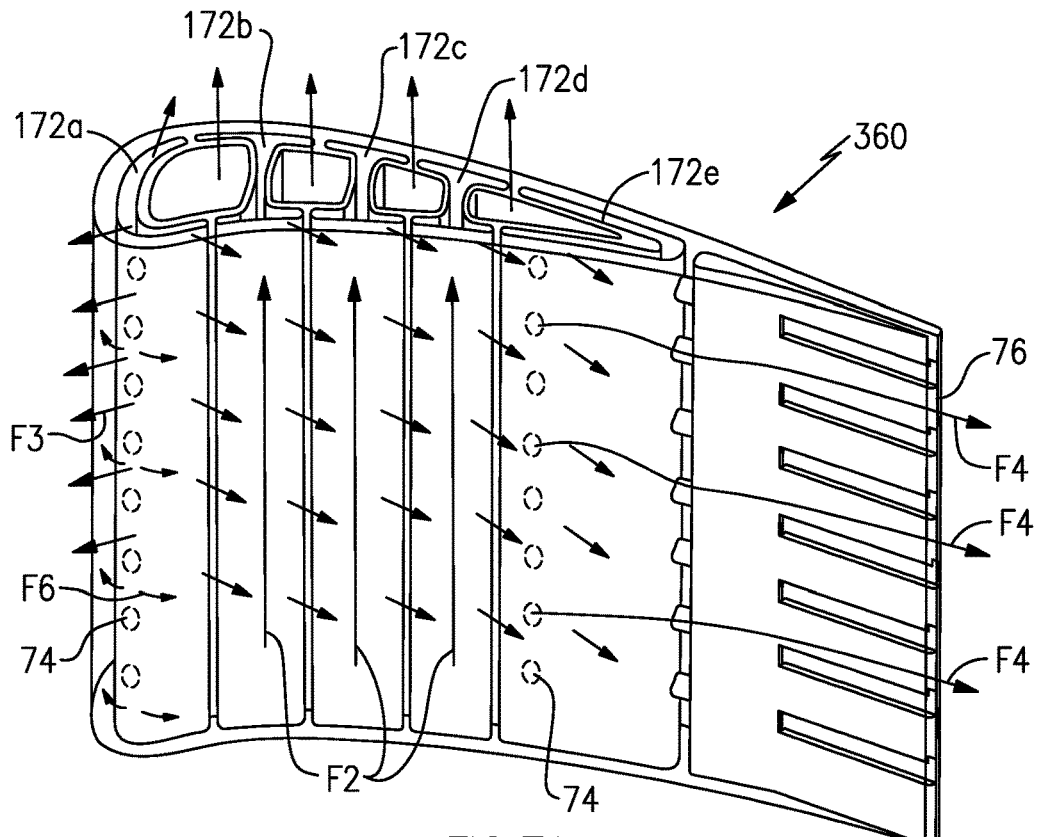
FIGS. 7A and 7B illustrate a modified airfoil that is configured for an impingement/axial cooling air flow pattern.
Figure 7B:
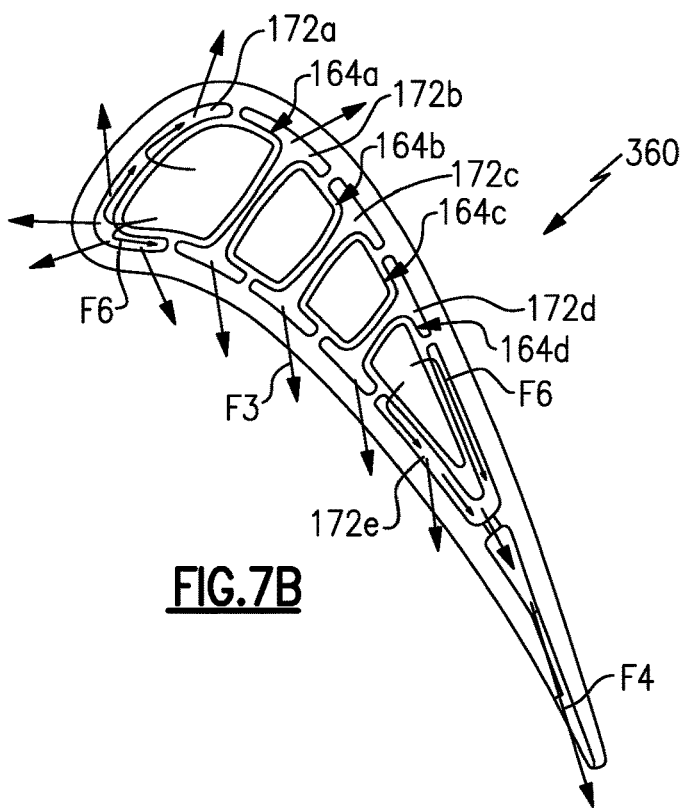

FIGS. 7A and 7B illustrate a modified example of an airfoil 360. The airfoil 360 is similar to the airfoil 160 but is configured for an impingement/axial cooling air flow pattern. In this example, the first rib 164a and the fourth rib 164d include cooling apertures 74 such that cooling air from the respective rib passages 68 impinges onto the interior surfaces of the side walls 62c/62d, as indicated by flow arrows F6. The impingement air discharged into the fifth cooling channel 172e then flows axially and is discharged through holes or slots 76 in the trailing end 62b. The impingement air discharged into the first cooling channel 172a impinges at the interior surface of the leading end 62a and is discharged through cooling holes or the like in the airfoil wall 62 as indicated by flow arrows F3.

Figure 8A:
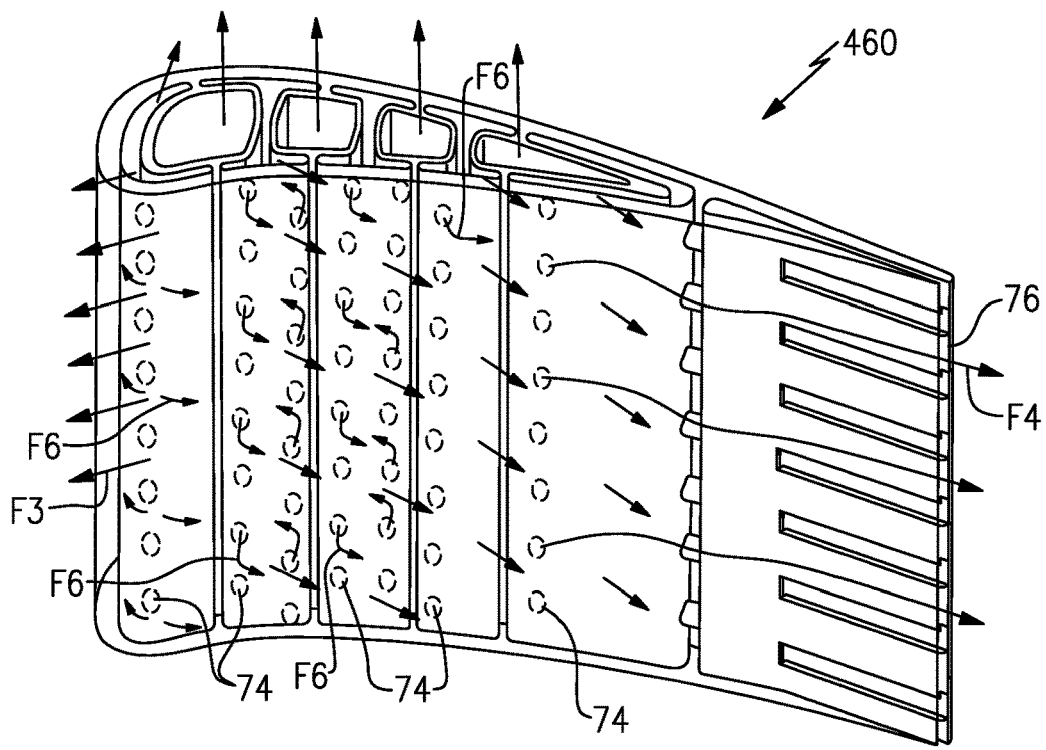
FIGS. 8A and 8B illustrate a modified airfoil that is configured for a full impingement cooling air flow pattern.
Figure 8B:
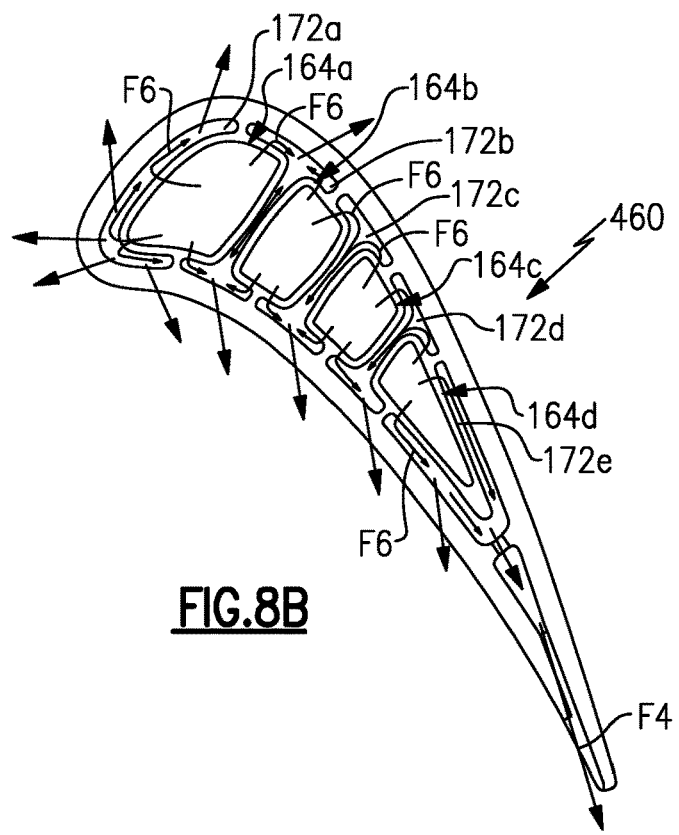

FIGS. 8A and 8B illustrate a modified example of an airfoil 460. The airfoil 460 is similar to the airfoil 360 but is configured for a full impingement cooling air flow pattern. In this example, each of the ribs 164a/164b/164c/164d includes cooling apertures 74 such that cooling air in the respective rib passages 68 impinges onto the interior surfaces of the side walls 62c/62d, as indicated by flow arrows F6.

The above-described configurations of the ribs 164a/164b/164c/164d and the cooling channels 172a/172b/172c/172d/172e facilitates cooling of the airfoil 160/260/360/460. For example, the cooling channels 172b/172c/172d are generally "H" shaped, with the side lobe portions of the "H" extending along, respectively, the first and second sides 62c/62d of the airfoil wall and the middle portion of the "H" extending between the respective ribs 164a/164b/164c/164d. The side lobe portions of the "H" have a low dimensional aspect ratio, meaning the axial distance of the side lobe portions of the "H" between adjacent rib connector arms is larger than the circumferential distance between the sides 62c/62d of the airfoil wall 62 and the rib sidewalls 66c/66d. Such a shape facilitates providing much of the cooling air flow along the sides 62c/62d of the airfoil wall 62 to enhance cooling. The middle portion of the "H" also connects the side lobe portions of the "H" such that cooling flow can migrate from the second side 62d to the first side 62c. For instance, the flow can be discharged exclusively or primarily through cooling holes on the higher pressure first side 62c, which facilitates reducing gaspath mixing losses that may be incurred if the cooling air was instead discharged to the lower gaspath pressure at the second side 62d. Additionally, if cooling apertures are only included on the second rib sidewall 66d, the cooling flow may be concentrated to impinge on the second airfoil sidewall 62c before flowing through the middle portion of the "H" and out through cooling holes on the first side 62c. Moreover, since the tube portions 66 are only connected to the sides 62c/62d via the connector arms 70a/70b, the rib passages 68 are substantially thermally isolated from the sides 62c/62d. Cooling air in the rib passages 68 thus remains relatively cool, to enhance cooling of the tip of the airfoil, platform of the airfoil, or other downstream structure.

The airfoils described herein may be fabricated from superalloys using such processes as investment casting or additive manufacturing. For example, in an investment casting process, an investment core is fabricated and then used in the casting of the superalloy to define internal features in the airfoil. Such an investment core can be formed from a ceramic or other suitable material in a molding process in which the ceramic or other material is injected into the cavity of a molding die. To form the ribs described herein, a sacrificial body with the shape of the ribs is inserted into the cavity and the ceramic or other material is molded around the sacrificial body. The sacrificial body may be formed of a thermoplastic or other material that can readily later be removed without damaging the core. The sacrificial body is then removed, such as by melting, leaving open the pattern of the ribs in the investment core. Subsequently, when the core is used in the investment casting, the superalloy fills the open pattern of the ribs left by the sacrificial body in the core, thereby forming the walls of the ribs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
 an airfoil wall defining a leading end, a trailing end, and first and second sides joining the leading end and the trailing end, the first and second sides spanning in a radial direction; and
 in serial order between the leading end and the trailing end, first, second, and third ribs connecting the first and second sides of the airfoil wall, each of the first, second, and third ribs defining
  a tube portion circumscribing a rib passage, and
  first and second connector arms solely joining the tube portion to, respectively, the first and second sides of the airfoil wall;
 the first rib and the airfoil wall bounding a first cooling channel there between that is flow isolated from the rib passage of the first rib;

the first rib, the second rib, and the airfoil wall bounding a second cooling channel there between that is flow isolated from the first cooling channel, the first rib having a first cooling aperture fluidly connecting the rib passage of the first rib and the second cooling channel; and the second rib, the third rib, and the airfoil wall bounding a third cooling channel there between that is flow isolated from each of the first cooling channel and the second cooling channel, the second rib having a second cooling aperture fluidly connecting the rib passage of the second rib and the third cooling channel.

2. The airfoil as recited in claim 1, further comprising a fourth rib also connecting the first and second sides of the airfoil wall and also defining a respective tube portion circumscribing a respective rib passage and respective first and second connector arms solely joining the tube portion to, respectively, the first and second sides of the airfoil wall.

3. The airfoil as recited in claim 2, wherein the third rib, the fourth rib, and the airfoil wall bound a fourth cooling channel there between.

4. The airfoil as recited in claim 3, wherein the fourth rib includes at least one cooling aperture aft of the respective connector arms of the fourth rib.

5. The airfoil as recited in claim 1, wherein, except for connection through the first and second wall of the airfoil wall, the first rib, the second rib, and the third rib are disjoined from each other.

6. The airfoil as recited in claim 1, wherein the airfoil wall includes cooling apertures connecting each of the first cooling channel, the second cooling channel, and the third cooling channel to an exterior gaspath.

7. The airfoil as recited in claim 1, wherein at least one of the first cooling channel, the second cooling channel, and the third cooling channel is connected to an exterior gaspath through cooling apertures in the first side of the airfoil wall but not the second side of the airfoil wall.

8. The airfoil as recited in claim 1, wherein the second cooling channel is H-shaped, with side lobe portions of the H-shape extending along, respectively, the first and second sides of the airfoil wall and a middle portion of the H-shape extending between the first and second ribs.

* * * * *